Dec. 15, 1959  L. RAMACHER ET AL  2,916,868
NUT WINDROWER
Filed June 26, 1958  2 Sheets-Sheet 1
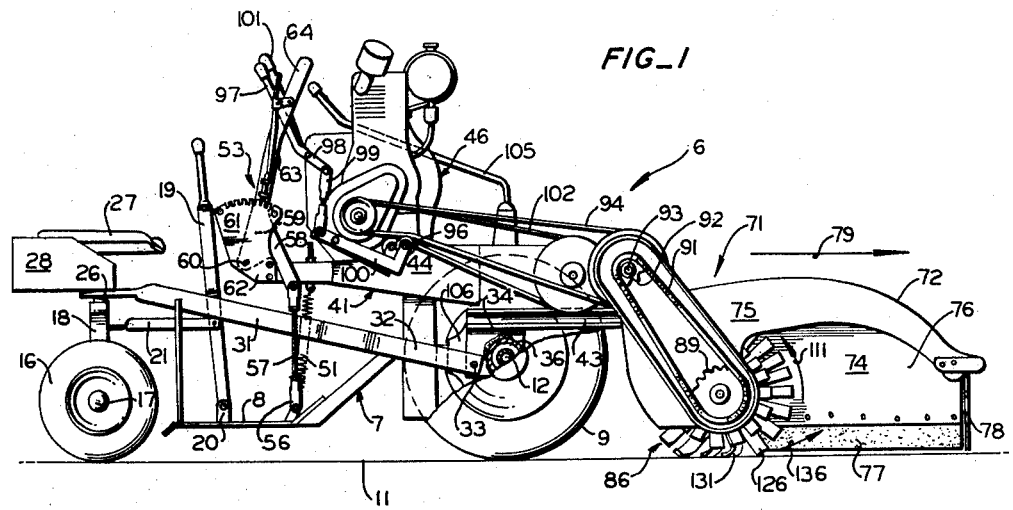
FIG_1
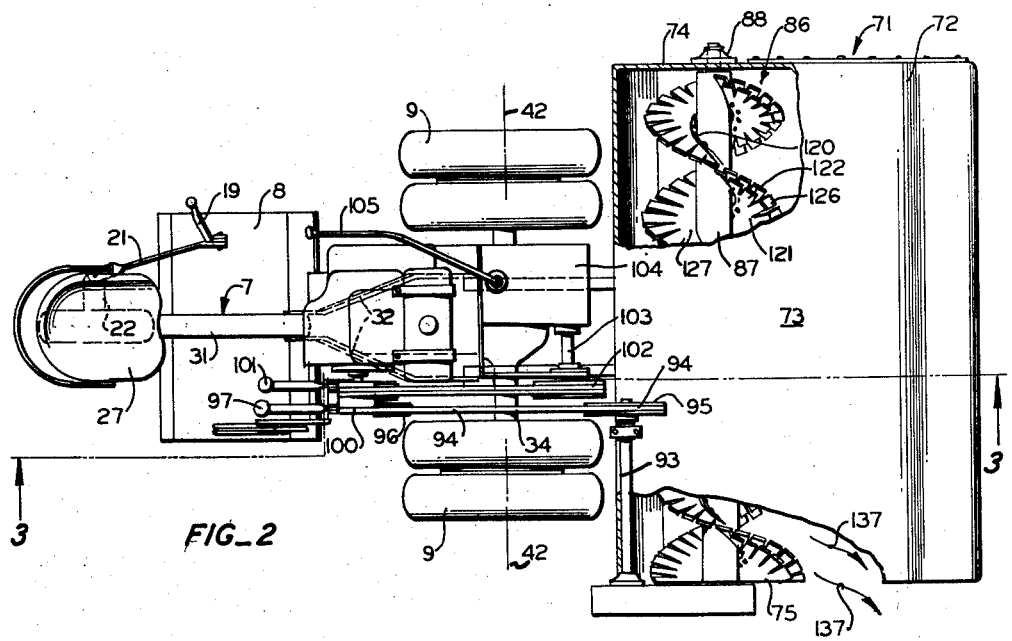
FIG_2
INVENTORS
LESLIE RAMACHER
RUDOLPH H. RAMACHER
BY
Lothrop & West
ATTORNEYS Dec. 15, 1959     L. RAMACHER ET AL     2,916,868
NUT WINDROWER
Filed June 26, 1958            2 Sheets-Sheet 2
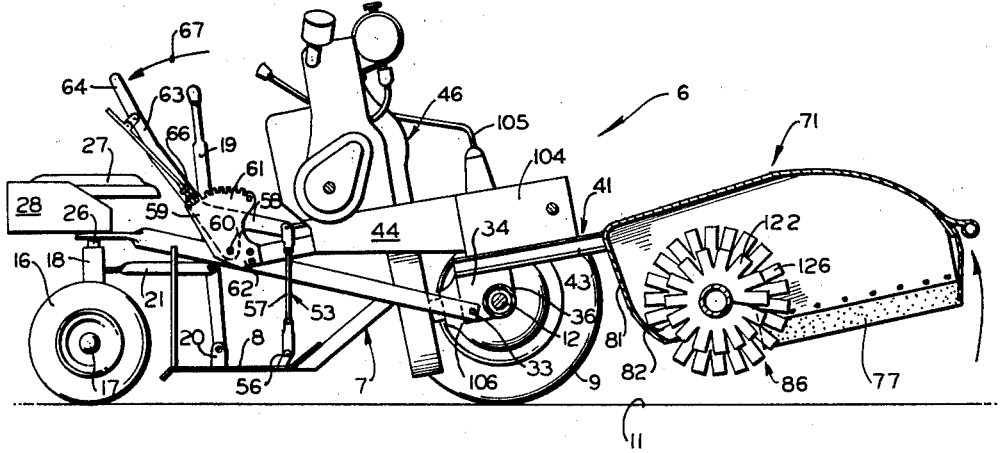
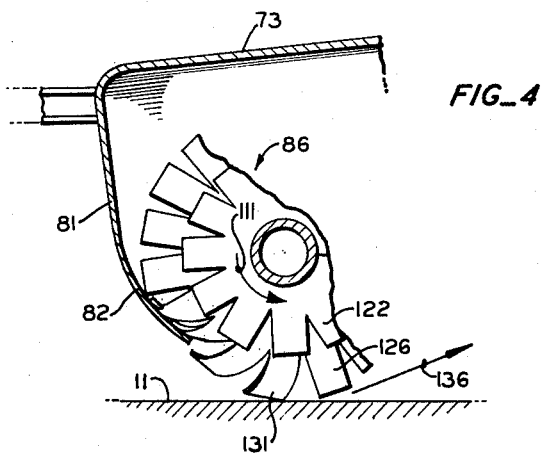
INVENTORS
LESLIE RAMACHER
RUDOLPH H. RAMACHER
BY
ATTORNEYS

United States Patent Office 2,916,868
Patented Dec. 15, 1959

2,916,868

NUT WINDROWER

Leslie Ramacher and Rudolph H. Ramacher, Stockton, Calif.

Application June 26, 1958, Serial No. 744,866

9 Claims. (Cl. 56—328)

The invention relates to devices for sweeping nuts and other ground harvested crops into windrows.

As is described in our co-pending application Serial No. 641,925, filed February 25, 1957, now Patent 2,854,-808 entitled "Machine for Windrowing Nuts," mechanical nut harvesters are ordinarily so cumbersome that they cannot approach a tree closely enough to reach the nuts lying on the ground around the trunk. Maneuverable, close-coupled windrowers are able to reach these nuts and sweep them into windrows readily accessible to the harvester.

Maximum recovery of nuts, either by windrower or harvester, is obtained by careful smoothing of the ground upon which the nuts, prunes or other crops fall. Were the surface of the ground as smooth as a table top substantially a hundred percent recovery could be expected. However, it is expensive to put the ground surface in such a condition, and windrowers of the type shown and described in said co-pending application have served in a highly satisfactory fashion to marshal nuts into windrows even though the ground surface is far from planar and compact.

Windrowers of the foregoing variety, while giving a high recovery under poor ground conditions, do not give a proportionately greater and faster yield where the ground is in relatively good condition and where the volume of nuts to be windrowed is large.

It is therefore an object of the invention to provide a nut windrower which is especially efficient in windrowing a large volume of nuts.

It is another object of the invention to provide a device for efficiently windrowing nuts located on ground which is in relatively good condition.

It is still another object of the invention to provide a highly maneuverable machine for windrowing nuts.

It is a further object of the invention to provide a nut windrower which effects a useful, at least partial preliminary separation of the nuts being windrowed from the attendant twigs, leaves etc., thus simplifying to some extent the later separation which is required.

It is yet a further object of the invention to provide a nut windrower which does not require for its efficient operation a careful attention to sweeper height relative to ground surface conditions.

It is another object of the invention to provide a generally improved nut windrower.

Other objects, together with the foregoing, are attained in the embodiment described in the following description and shown in the accompanying drawings in which:

Figure 1 is a right side elevation partially in section, the sweeper cowling being shown in sweeper-operating attitude;

Figure 2 is a plan view of the device shown in Figure 1 with parts broken away and shown in section;

Figure 3 is a sectional view showing the cowling and sweepers in elevated position, the plane of section being indicated by the line 3—3 in Figure 2; and Figure 4 is a section, to an enlarged scale, of the sweepers and the adjacent arcuate back plate.

While the nut windrower of the invention is susceptible of numerous physical embodiments depending on the environment and the particular requirements of use, substantial members of the herein shown and described embodiment have been made, sold and used and all have performed in a highly satisfactory fashion.

The windrower of the invention, generally designated by the numeral 6, comprises a frame 7, including a footboard 8, or floorboard, the frame being supported adjacent its forward end by a pair of double ground-engaging wheels 9 movable along the ground 11, the wheels 9 being mounted on a live axle 12, or shaft.

The after or rearward end of the frame is supported by a single ground-engaging wheel 16 journalled on a stub axle 17 projecting horizontally from a sleeve 18, the sleeve 18 being rotatable about a vertical axis. Positioning of the sleeve 18, and thus of the wheel 16, is effected by fore and aft movement of a hand lever 19, pivotally mounted on the floorboard 8 as at 20 and acting through a link 21 pivotally connected to the lever 19 and to a moment arm 22 projecting laterally from the sleeve 18.

The sleeve 18 encompasses a vertical rear frame member 26 supporting the driver's seat 27, a box member 28 under the seat being used to store small tools, rags, etc.

The frame 7 includes a somewhat inclined fore and aft member 31 secured to the seat member 26 and extending forwardly where it branches, in Y fashion, into a pair of arms 32 each pivotally mounted as at 33 on a flange 34 secured to a load-carrying axle 36 within which the wheel shaft 12 is journalled.

Supported on the flanges 34 is a structure generally termed a platform 41, the platform 41 being tiltable, within limits, about a horizontal transverse axis 42 substantially coincident with the axis of the axle 36. The platform 41 includes a generally horizontal sub-frame 43 affixed to and supported by the flanges 34; the sub-frame 43, in turn, supporting a rearwardly extending mounting frame 44 serving to support a prime mover such as an internal combustion engine 46 of conventional make and provided with the customary engine controls.

A tension spring 51 secured to the after end of the platform 41 and to the footboard 8, as appears most clearly in Figure 1, tends to urge the after end of the platform 41 in a downward direction and thus augments the downward gravitational force exerted by the engine 46 and the attendant structure located on the after portion of the platform framework 41.

Serving precisely to incline the platform 41 to any predetermined position relative to the fixed main frame 7 is a linkage mechanism generally designated by the numeral 53. Pivotally mounted, as at 56, on the floorboard 8 is an adjustable vertical link 57 pivotally connected at its upper end to a lower arm 58 of a bell-crank 59 pivotally attached as by a pivot pin 60 to a notched quadrant plate 61 rigidly secured to an after extension 62 of the platform 41. An upper arm 63 of the bell-crank 59 is elongated and thus provides a substantial moment arm for the driver who grasps a handle portion 64 on the arm 63 and who is thus able to move the arm 63 through an arc substantially coextensive with the quadrant arc. A conventional hand-actuated latch 66 engageable with the notches enables the driver to latch the lever arm 63 in any predetermined location.

In tilting the platform 41 and attendant mechanism from the substantially horizontal attitude shown in Figure 1 to the inclined attitude shown in Figure 3, the driver grasps the handle 64, disengages the latch and pulls backwardly on the lever 63 in the direction indicated by the arrow 67 in Figure 3. The link 57 is rockable, of course, only through a fixed radius. Consequently, as the lever 63 swings in the direction 67, the bell crank 59 exerts a powerful downward force through the pivot pin 60 to the after extension 62 of the platform 41, it being noted that the distance between the pin 60 and the axis 42 of pivot of the platform 41 is also considerable, so that the moment arm through which downward force is applied to the platform is substantial. Furthermore, the downward gravitational force of the engine and the tension of the spring 51, assists the driver in inclining the platform 41 in any desired attitude.

A countervailing or counterbalancing force, however, is the weight of the nut sweeping structure, generally designated by the numeral 71, the structure 71 being mounted on the forward or leading end of the platform 41 and being tiltable with the platform.

The sweeping structure 71 includes a cowl 72, or hood, defined by a forwardly and downwardly extending cover 73, a first vertical side plate 74 extending downwardly toward and to within a few inches of the ground, and a second vertical side plate 75 coextensive with the side plate 74 over the after portion but narrowing in vertical dimension over the forward portion and defining a roughly rectangular opening 76 through which the nuts are swept. A stiff rubber curtain 77 depends from the lower edge of the first side plate 74 and serves to divide, or channel the nuts on the ground, the nuts inboard of the curtain being acted upon by the sweepers. A somewhat more flexible curtain 78 hangs down from the forward end of the cover 73 and is preferably slit into a plurality of vertical fingers permitting nuts, twigs, etc. to pass therethrough into the interior cowl chamber as the machine moves forwardly in the direction indicated by the arrow 79.

A back plate 81, as appears most clearly in Figures 3 and 4, depends from the rear end of the cover plate and extends transversely between the after edges of the side plates 74 and 75. The lower portion 82 of the back plate is curved arcuately forwardly and downwardly and coacts with the windrowing sweeper structure 86 in an important fashion, shortly to be described.

The sweeper structure 86 comprises a rotatable transverse shaft 87 journalled at its opposite ends in suitable bearings 88 mounted on the side plates 74 and 75. Adjacent one end, the shaft projects exteriorly of the side plate, for example, the side plate 75, and is provided with a sprocket gear 89 rotated by a chain 91 driven by a sprocket gear 92 mounted on the end of a cross shaft 93. The shaft 93, in turn, is rotated by a V-belt 94 reeved about a sheave 95. Driving tension on the V-belt 94 is provided by a tensioning roller 96 manipulated by a suitable lever 97 acting through a conventional intermediate linkage system 98, 99 and 100.

In comparable fashion, the wheels 9 are appropriately actuated, a lever 101 controlling the tension on a V-belt 102 which rotates a shaft 103 leading into a transmission unit 104 including a gear shift lever 105. Through appropriate power transmitting elements (not shown in detail, but including a differential mechanism 106) tractive effort is exerted at the ground-engaging wheels 9.

The sweeper structure 86 is rotated in the direction indicated most clearly by the arrows 111 in Figures 1 and 4, the overall effect being to transport laterally any nuts on the ground and to deposit the nuts in a windrow adjacent the side plate 75.

Sweeping is effected by the cooperation of a relatively small, or short, and stiff helix 121 suitably wound about and affixed to the rotatable shaft 87, as by bolting it to a metal plate or helix 120 welded to the shaft. The helix 121 extends between the opposite or facing walls of the side plates 74 and 75. A plurality of substantially radial slits divides the helix 121 into a plurality of short rigid sweeping fingers 122 each inclined at the angle of axial advance of the helix envelope. The fingers 122 are very strong and are capable of laterally sweeping or urging a large volume of nuts and associated material. The fingers 122, however, do not extend downwardly to mean ground level and thus are ordinarily unable to retrieve nuts located in depressions in the ground. This task is reserved for a plurality of very flexible elongated fingers 126 formed by substantially radially slitting a very resilient and relatively large helix 127 wound about and secured to the metal helix 120 on the shaft 87. The large helix 127 is in face to face engagement with the small helix 121 and is disposed on the back side of the small helix when viewed from the direction of axial advance of the helix as the sweepers rotate in the direction 111. This placement stiffens the short or inner fingers 122, but does not reduce the resiliency of the tips of the fingers 126.

It is especially to be noted that the individual fingers 126 are, by virtue of being formed from a helix, inclined in a direction such that when the tip portion 131 of each of the fingers comes into contact with a nut located in a depression, as appears in Figures 1 and 4, and the nut is flipped or rolled out of the depression, as the resilient tip returns to radial attitude, the nut is given not only a forward and upward motion, as indicated by the arrow 136 in Figures 1 and 4, but also a lateral and outward motion as indicated by the arrows 137 in Figure 2. The important overall effect of this is to flip outwardly through the side opening 76 a great many nuts without their ever having to be acted upon by the short fingers 122.

Additionally, the combined helices or augurs create a substantial air-pumping or air-fanning effect which blows air and light materials, such as leaves and twigs, laterally outwardly through the opening. This action assists the sweepers in accomplishing their basic function of moving the nuts laterally into windrows. Less clogging, entrapment and intermixing of nuts and extraneous materials appears to result from the air blast set up within the cowling chamber and the attendant discharge through the opening. A preliminary or "rough" separation is thereby achieved.

The helical inclination of each of the fingers, particularly of the long, resilient fingers permits of still another advantage. Since the effect of the cant or inclination of the fingers is to add slightly to their beam strength, in a fore and aft direction, the fingers are capable of supporting that portion of the weight of the structure 71 not counterbalanced by the engine and the spring 51. Consequently, if the driver places the platform tilting lever 63 at the approximate location shown in Figure 1, and locks the latch 66 in open or disengaged position with respect to the quadrant notches, the long sweeping fingers 126 will assume and support the excess weight without undue bending or buckling of the fingers. This situation obtains not only when the machine is stationary, but when the machine is moving. The condition can best be described by saying that the windrowing structure "floats" as it moves along over the ground, the fingers closely following the contour of the ground as the machine advances. Consequently, a very efficient yield and a high volume is handled with a minimum of attention being required by the driver. It is no longer necessary for him to make continuous adjustments of the tilting mechanism since the platform 41 maintains at all times the proper attitude determined by the ground contour, the fingers entering the ground a distance sufficient to support the weight.

As appears most clearly in Figure 4, the long fingers 126 cooperate very efficiently with the arcuate back plate portion 82, the fingers being flexed so as to snap downwardly and forwardly against any nuts deposited in depressions, the effect being to flip the nuts out. Since the long fingers do not face straight ahead, but have a lateral component, the nuts are flipped not only forwardly but laterally as well, as indicated by the arrows 137. The back plate, in addition confines and re-directs any nuts carried over the top of the sweepers with brush thus reducing losses from this reason. The back plate serves, as well, to urge the nuts laterally by virtue of the augur action of the long fingers as they sweep across the back plate.

It can therefore be seen that we have provided a nut windrower which is exceptionally efficient over a wide range of ground conditions, and volume of crop, and which, furthermore, is very easy to operate for extended periods of use.

What is claimed is:

1. A nut windrower comprising a frame mounted on ground-engaging wheels, means on said frame for advancing said frame along a predetermined path over the ground, a cowl pivotally mounted on the forward end of said frame to form an enclosure, said cowl having an opening on one side of said cowl, a transverse shaft rotatably mounted on said cowl, a small diameter helix mounted on said shaft, said small diameter helix including a trailing surface and a leading surface, said leading surface facing toward said opening, and a large diameter helix mounted on said shaft, said large diameter helix including a leading surface facing toward said opening and being in face-to-face engagement with said trailing surface of said small diameter helix, said leading surfaces of said helices being effective to urge nuts toward said opening in said cowl.

2. The device of claim 1 wherein said smaller diameter helix is substantially more rigid than said larger diameter helix.

3. The device of claim 1 wherein the margins of said helices are provided with slits which define on each helix a plurality of marginal fingers.

4. The device of claim 3 further characterized by an arcute back plate on said cowl, the lower margin of said back plate being in interfering relation with the adjacent fingers of said larger diameter helix.

5. The device of claim 3 wherein the combined weights of said cowl, said shaft and said helices are partially counterbalanced by said advancing means on said frame, said marginal fingers of said larger diameter helix in instantaneous contact with the ground being strong enough to support the unbalanced portion of said combined weights.

6. A nut windrower comprising a frame including a cowl movable over the surface of the ground, said cowl having a transversely facing opening on one side, a transverse shaft rotatably mounted on said cowl within said enclosure, a relatively small and relatively stiff helix mounted on said shaft and rotatable therewith in a direction such that the leading surface thereof faces toward said opening, and a relatively large and relatively flexible helix mounted on said shaft and being mounted in face-to-face contact with the trailing surface of said relatively small and relatively stiff helix.

7. The device of claim 6 further characterized by a mounting plate helically mounted on said shaft, said plate having both of said helices mounted thereon.

8. The device of claim 6 wherein the margins of said helices are provided with slits which define a plurality of fingers.

9. The device of claim 8 in combination with an arcuate plate forming the rear wall of said cowl and extending downwardly toward the ground into interfering relation with said fingers of said relatively large and relatively flexible helix.

References Cited in the file of this patent

UNITED STATES PATENTS

| | | |
|---|---|---|
| 2,675,750 | Boyer | Apr. 20, 1954 |
| 2,750,726 | Boucard et al. | June 19, 1956 |
| 2,854,808 | Ramacher et al. | Oct. 7, 1958 |